United States Patent
Vennström et al.

(10) Patent No.: US 9,143,880 B2
(45) Date of Patent: Sep. 22, 2015

(54) SYSTEMS AND METHODS FOR PROVIDING AUDIO TO A USER BASED ON GAZE INPUT

(71) Applicant: Tobii AB, Danderyd (SE)

(72) Inventors: Anders Vennström, Stockholm (SE); Fredrik Lindh, Solna (SE)

(73) Assignee: TOBII AB, Danderyd (SE)

( * ) Notice: Subject to any disclaimer, the term of this patent is extended or adjusted under 35 U.S.C. 154(b) by 0 days.

(21) Appl. No.: 14/467,944

(22) Filed: Aug. 25, 2014

(65) Prior Publication Data
US 2015/0055808 A1    Feb. 26, 2015

Related U.S. Application Data

(60) Provisional application No. 61/869,501, filed on Aug. 23, 2013.

(51) Int. Cl.
*H04S 7/00*     (2006.01)
*G06F 3/01*     (2006.01)
*G06F 3/16*     (2006.01)

(52) U.S. Cl.
CPC ............. *H04S 7/307* (2013.01); *G06F 3/013* (2013.01); *G06F 3/167* (2013.01); *H04S 2400/01* (2013.01); *H04S 2400/13* (2013.01)

(58) Field of Classification Search
CPC ......... G06F 3/165; G06F 3/011; G06F 3/013; G06F 3/102; G06F 3/167; H04R 3/12; H04S 7/303; H04S 7/302; H04S 7/30; H04S 7/307; H04S 2400/13; H04S 2400/01; H04H 60/33
USPC .............. 381/77, 80, 81, 306, 310, 333, 104, 381/107, 119, 123, 307
See application file for complete search history.

(56) References Cited

U.S. PATENT DOCUMENTS

| | | | | |
|---|---|---|---|---|
| 7,602,924 | B2* | 10/2009 | Kleen | 381/61 |
| 7,668,317 | B2* | 2/2010 | Yang et al. | 381/22 |
| 2012/0163606 | A1* | 6/2012 | Eronen et al. | 381/22 |
| 2013/0208926 | A1* | 8/2013 | Vincent et al. | 381/300 |
| 2014/0010391 | A1* | 1/2014 | Ek et al. | 381/310 |
| 2014/0328505 | A1* | 11/2014 | Heinemann et al. | 381/303 |

* cited by examiner

*Primary Examiner* — Vivian Chin
*Assistant Examiner* — Jason R Kurr
(74) *Attorney, Agent, or Firm* — Kilpatrick Townsend & Stockton LLP

(57) ABSTRACT

According to the invention, a method for providing audio to a user is disclosed. The method may include determining, with an eye tracking device, a gaze point of a user on a display. The method may also include causing, with a computer system, an audio device to produce audio to the user, where content of the audio may be based at least in part on the gaze point of the user on the display.

19 Claims, 8 Drawing Sheets

SYSTEMS AND METHODS FOR PROVIDING AUDIO TO A USER BASED ON GAZE INPUT

CROSS-REFERENCE TO RELATED APPLICATIONS

This application claims priority to Provisional U.S. Patent Application No. 61/869,501, filed Aug. 23, 2013, and entitled "GAZE INFORMATION AND INTERACTIVE ENTERTAINMENT," the entire disclosure of which is hereby incorporated by reference, for all purposes, as if fully set forth herein.

This application is also related to U.S. patent application Ser. No. 14/467,877, filed Aug. 25, 2014, and entitled "SYSTEMS AND METHODS FOR CHANGING BEHAVIOR OF COMPUTER PROGRAM ELEMENTS BASED ON GAZE INPUT," the entire disclosure of which is hereby incorporated by reference, for all purposes, as if fully set forth herein.

BACKGROUND OF THE INVENTION

The present invention generally relates to systems and methods for human and computer interaction utilizing gaze direction information, and in particular, to systems and methods for use in relation to graphical user interfaces, games or other human computer interaction intensive applications.

Interactions between users and computers comprise many forms and have evolved heavily over the years. Typical interactions are based upon mechanical type inputs by the user, to the computer. For example a user typically drives a computer through the use of a keyboard and mouse. The keyboard and mouse rely heavily upon a user's fine motor skills and reflexes. Taking a modern computer game as an example, success may depend on the ability to quickly and accurately move a mouse in response to actions shown upon a screen. A user's skill at the game is therefore dictated by their level of coordination.

Recently, new input modalities have gained popularity. For example touch and gesture based input devices are now in somewhat popular use. A touch based input device relies on a user physically contacting a surface, normally a display, in order to interact with a computer. A gesture based input device relies on a user performing a gesture with a body part, for example waving or swiping in raid-air with a hand. This gesture is captured by an optical system of some form comprising a camera and light source.

All traditional input modalities share a common problem, they rely on a user's ability to accurately direct a body part to a particular point of interest on a computer display. This introduces the possibility of error between a user's intended point of interest on the display, and the actual point of interest provided to the computer via the traditional input modality.

A true representation of a user's point of interest may be obtained by tracking the direction of the user's gaze. Gaze or eye tracking technology is not new, many examples are provided in the market such as those sold by Tobii Technology (www.tobii.com) and described in U.S. Pat. No. 7,572,008.

Utilizing gaze direction information for simple interactions with a computer has also been previously described, one such example is U.S. Pat. No. 6,204,828 which describes a system for moving a cursor on a display in response to a user's gaze direction.

Previous input systems using gaze directions have been focused on basic input techniques, where a manual input method is replaced by a gaze component. There exists a problem of how to fully utilize the benefits of gaze direction information in human computer interaction, such that the gaze direction information does not just replace a portion of a mechanical input method but complements and enhances the ability of a user to interact with a computer.

BRIEF DESCRIPTION OF THE INVENTION

In one embodiment, a method for providing audio to a user is provided. The method may include determining, with an eye tracking device, a gaze point of a user on a display. The method may also include causing, with a computer system, an audio device to produce audio to the user, where content of the audio may be based at least in part on the gaze point of the user on the display.

In another embodiment, a system for providing audio to a user is provided. The system may include an eye tracking device for at least determining a gaze point of a user on a display. The system may also include a computer system for at least causing an audio device to produce audio to the user, where content of the audio may be based at least in part on the gaze point of the user on the display.

In another embodiment, a non-transitory machine readable medium with instructions stored thereon for providing audio to a user is provided. The instructions may be executable by at least one processor for at least determining a gaze point of a user on a display. The instruction may also be executable for causing an audio device to produce audio to the user, where content of the audio may be based at least in part on the gaze point of the user on the display.

BRIEF DESCRIPTION OF THE DRAWINGS

The present invention is described in conjunction with the appended figures.

Figure 1:
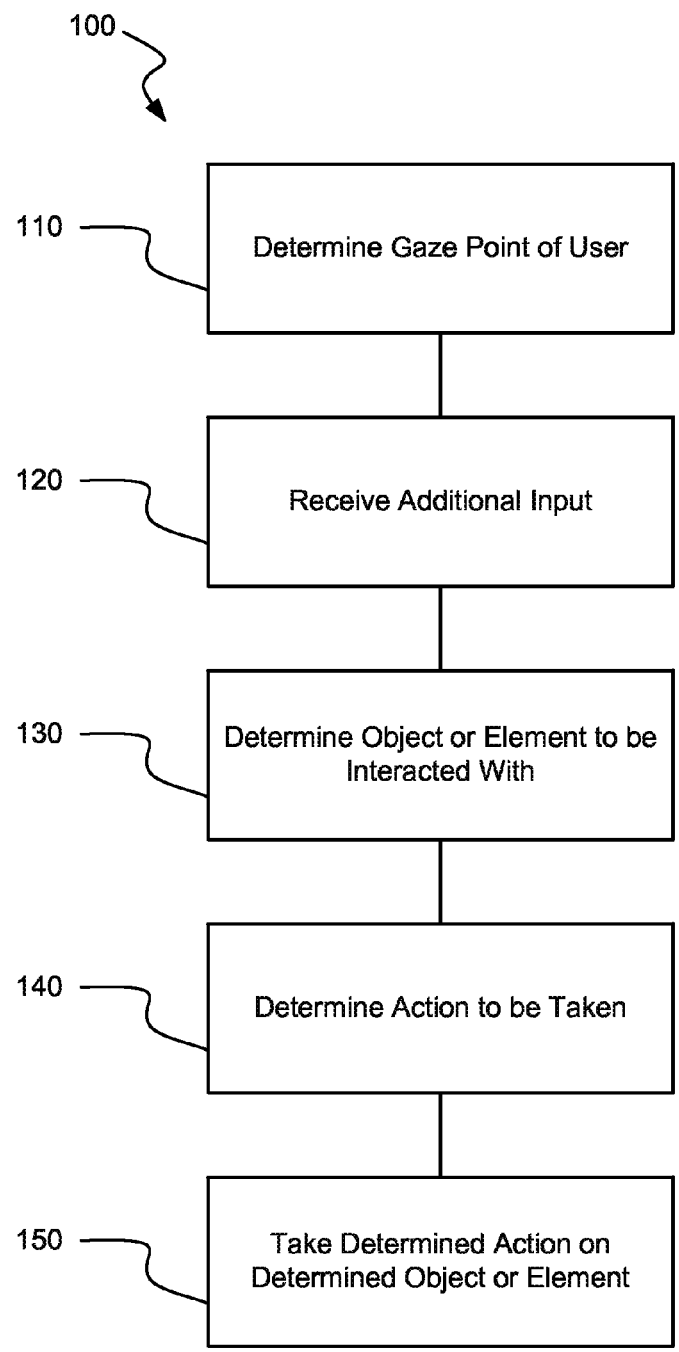
FIG. 1 is an block diagram of one method of the invention for issuing commands at a gaze location.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. One of skill in the art will understand that various changes may be made in the function and arrangement of elements without departing from the spirit and scope of the invention as set forth in the appended claims. For example, not every detail of each embodiment discussed herein may be present in all versions of that embodiment, or details of one embodiment discusses herein may be present in any version of other embodiments discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments, or there may be additional operations not discussed with specific regard to the particular process. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. One or more processors may perform the necessary tasks.

Issue Command at Gaze Location

According to one embodiment of the present invention, a method for human computer interaction is provided whereby a computer displays items upon a display. The user may issue commands to the computer that modify the items on the display. In order to determine which items are to be modified, a gaze detection unit detects the user's point of interest on the display. The user then issues commands to the computer such that the items located at or near to the point of interest are modified. Both visual and underlying aspects of the items may be modified. For example, the appearance of an item could be modified, or characteristics of the item, and how it interacts with the user and/or performs further in the context of the particular program may be modified (e.g., the speed at which it moves, the actions it may take, etc.)

The user may issue commands to the computer via any form of input device, including traditional keyboard and mouse, voice commands, and/or a gaze detection unit. In some embodiments, combinations of such inputs may be combined and interpreted to mean different commands than when any individual input via a single device is received.

To demonstrate this embodiment, the example of a computer game is provided. A computer game displays many items across a display, for example a first person shooter (FPS) style computer game will often realistically display warfare and conditions of warfare such as terrain, moving vehicles, soldiers and the like. The user interacts with the game by providing the computer with commands, such as where to move a character, where to shoot, when to jump, when to run, when to crawl etc.

A gaze detection unit determines the user's point of interest on a display and, according to one embodiment of the present invention, the user enters a command to control a character or other component in a game. The command modifies items on the display at the location of the user's point of interest as determined by the gaze detection unit. For example, in the case of an FPS style computer game, a user may press a mouse button or game controller button in order to 'fire' a gun. By registering the user's point of interest, when the user provides the command for firing the gun, the result of the command takes place at the location of the point of interest. In this way, the user may look at the intended target of the simulated gun firing and maintain a higher level of control as to the accuracy to the game, when compared to traditional computer game controls.

As another example, the user's point of interest may be used to indicate which object on a display upon which the perform an action. Take for example a computer game in which a character lays upon the ground and aims through a sniper rifle. Traditionally, if an enemy character approaches the user would fire the sniper rifle upon issuing a fire command to the computer program. By utilizing gaze information however, the user may look to the left or right of the screen which may signify that the user wishes to use a different weapon, such as a sidearm or the like. In this manner, the user may control the character to leave the sniper rifle upon the ground, engage the enemy with an alternative weapon, and then return to the sniper rifle to continue advancing through the game.

Thus, with reference to FIG. 1, in one method 100 provided by an embodiment of the invention, the gaze point of a user on a display may be determined at block 110. In some embodiments, an additional input, such as a keystroke, controller input, or voice command, may also be received at block 120. At block 130, it may be determined what displayed object or other program element is intended to be acted on as correlated with the gaze point and/or additional input. At block 140, it may be determined what specific action is correlated with the gaze point and/or additional input. At block 150, the action may be taken on the displayed object or other program element.

Directional Audio

In another embodiment of the present invention, a method for influencing audio heard by an operator of a computing device is provided.

According to this embodiment, there is provided a computing device, a gaze detection device and a computer program executed by the computing device. As with any embodiment discussed herein, the gaze detection device may be integrated with the computing device or may be separate but connected to the computing device by wired or wireless means. Additionally, the gaze detection device may be worn by the user, or observe the user from another separate position.

The gaze detection device determines the location on a screen at which a user is looking, i.e. the "gaze point." The computer program utilizes the gaze point to perform an action that outputs (or, in other words, reproduces and/or produces) sound from the computing device or manipulates sound already being outputted from the computer.

For example, in the case of a computer game having multiple characters (avatars e.g. representations of people or the like) on a screen with which each character simulated to be talking, the gaze direction may be utilized to determine which characters speech to be emitted by the computing device.

The speech may be emitted by more than one character at a time and only the volume of the speech altered dependent upon the gaze location, or only one character's speech may be emitted based on the gaze location.

For example, in the case of a computer game wherein a user's field of view is simulated upon a display, detecting of a gaze location on a character on the left side of the field of view may result in speech emitted from a character or characters on the right side of the field of view being reduced in volume, while speech from the character on the left side of the field of view being maintained at 'normal' volume or increased in volume.

This alteration of volume may happen almost instantaneously, such that as the user looks upon different locations on a display, the volume of speech from different characters increases and decreases based on the proximity of the user's gaze to the character. Alternatively, the alteration of volume may happen in a non-instantaneous manner so as to provide smooth audio output to a user and accommodate for rapid gaze movement. For example, audio may only change based on the user's gaze direction if the user fixates upon a location for a pre-determined threshold of time.

Of course, speech is only but one example of audio that may be emitted by a computing device. Music, sound effects and the like may also be emitted. In fact, any sound capable of being produced by a computing device may be used successfully with this invention.

The present invention may also utilize channels of audio, for example left and right channels in a stereo audio system may be used to emit different volumes and/or different sounds depending on the user's gaze location. For example, if a gaze direction is determined to be the center of a display, all sounds intended to be conveyed to the left of the center of the display may be emitted through the left audio channel of the computing device and all sounds intended to be conveyed to the right of the display may be emitted through the right audio channel of the computing device. If gaze direction is determined to be to either the left or right of the center of the display, either the left or right audio channel, as applicable, may be used in isolation. Sounds conveyed via 'surround sound' systems (e.g., 5.1 or 6.1 audio channel systems) may be manipulated in similar manners based on detected gaze direction. Further, different wavelengths of audio may be separated and emitted from the same or different speakers according to the position of the gaze direction.

Any form of sound emitting device is suitable for use with this embodiment of the present invention, for example headphones, speakers or the like. The audio devices may be monophonic, stereophonic, or multi-channel (e.g., surround-sound) devices. In some embodiments, the audio device, while only stereophonic, may produce simulated multi-channel sound).

Any form of sound or audio is suitable for use with this embodiment of the present invention, for example speech, sound effects, music etc. Sound may be provided by a computer program directly or by a third party, such as a human user running a version of the same or similar computer program at another location, and sound such as the user's speech transmitted via the interact or other communication network or protocol.

Figure 2:
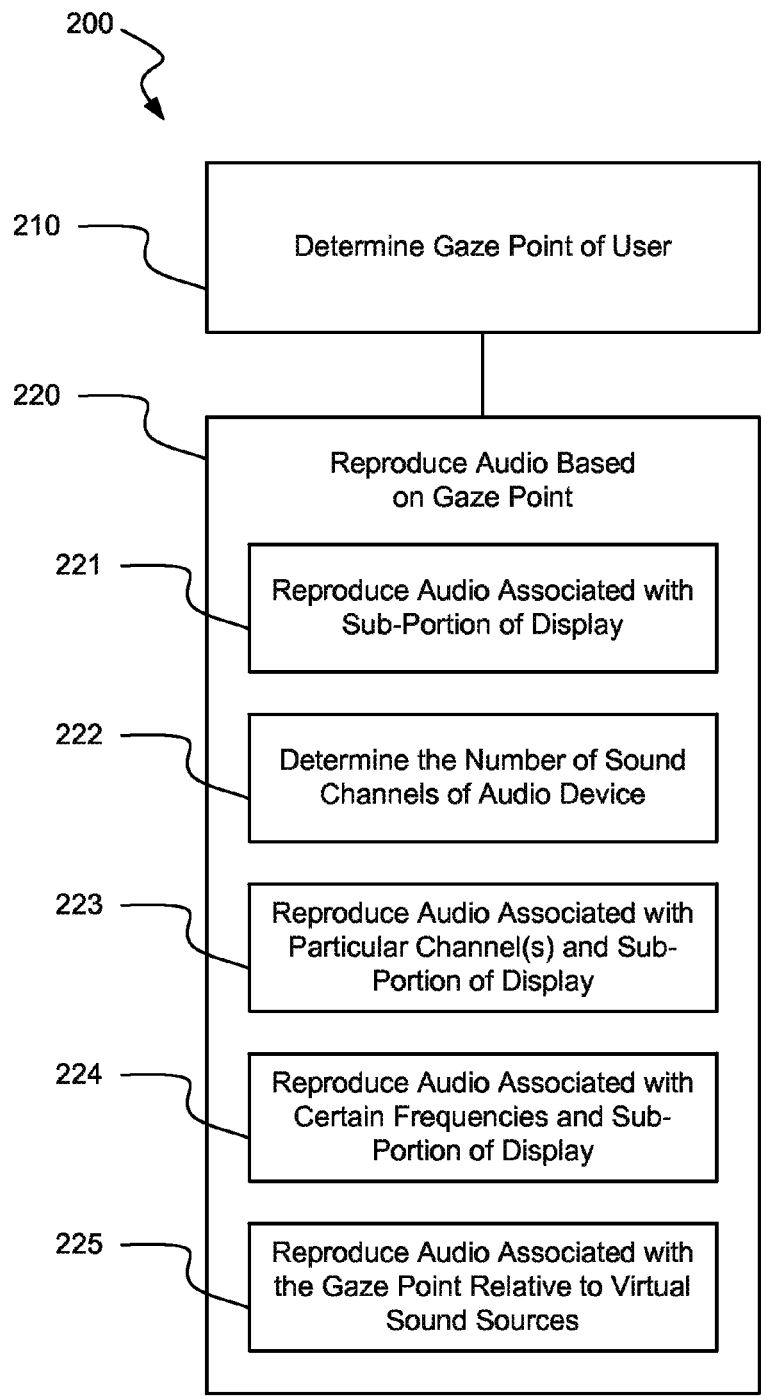
FIG. 2 is a block diagram of one method of the invention for providing audio to a user based on gaze input.

Thus, with reference to FIG. 2, one method 200 of providing audio to a user is shown. At block 210, the gaze point of a user on a display may be determined. At block 220, an audio device may produce audio based at least in part on the gaze point of the user on the display, wherein the content of the audio is dependent on the gaze point of the user.

The manner in which the content is determined may vary depending on the embodiment of the invention. At block 221, audio content delivered may be associated with a particular area of the display in which the gaze point of the user is located, where the particular area is a sub-portion of a total area of the display. In some embodiments, this may mean that only audio associated with the particular area is produced. In other embodiments, audio associated with the particular volume may be presented at one volume, and other audio associated with other portions of the display may be produced at a lower volume.

In an alternative embodiment, at block 222, it may be determined how many sound channels, real or simulated, are produced by the audio device. This information may be used to deliver audio via the multi-channel audio device in a number of ways.

At block 223, one or more sound channels associated with a particular area of the display in which the gaze point lies may be determined and produced. In some embodiments, some channels may have no audio content produced when the gaze point is associated with sub-portions of the display corresponding to another channel. In other embodiments, different channels may be produced at different volumes depending on where the gaze point lies.

At block 224, the content delivered by the audio device may vary by frequency depending on the location of the gaze point. Which channels produce what frequencies may also vary depending on the gaze point.

At block 225, a virtual distance and direction from each of a plurality of virtual sound sources to the gaze point of the user on the display may be determined. The virtual distance and direction may be measured along the X, Y and Z axis of the display and/or virtual world. The content of the audio may then include each virtual sound source being produced in a manner based at least in part on the virtual distance and direction from the virtual sound source to the gaze point of the user.

By way of example, consider an interactive game where the user is interacting within a simulated war environment. Displayed on screen may be many audio producing items such as characters shooting weapons, tanks firing weapons, explosions, characters speaking or yelling, and planes flying. According to embodiments of the present invention, when a user locates his or her gaze upon a point on the display, a virtual distance is determined between that point and other audio producing items on the display. Based on this virtual distance, levels of audio are provided to the user, for example an explosion adjacent the point on the display may be provided at a relatively high volume, whereas a plane flying some distance from the point on the display may be provided at a relatively low volume. According to the present invention it is possible to emit multiple such sources of audio at different, dynamic volume levels based on their virtual distance from a point on the display (e.g., the gaze point).

Map Control

In another embodiment of the present invention, a method for manipulating an object on a display that represents a topographical view of a large area or the like, is provided. In other words, a map displayed upon a display may be manipulated according to gaze direction information.

A computer program operates on (i.e., is executed by) a computer device, the computer program displays upon a display device connected to the computer device a map representing an area. Portions of the map may be enlarged or minimized in order to view the portions in greater or lesser detail, this is commonly known as "zooming in" or "zooming out" the map.

The location of the portion of the map to zoom in or zoom out is determined by a user. Typically this determination is performed by positioning a pointing device such as a mouse on a portion of the map, and then providing a command to zoom in or out the map. The command may be provided by moving a scroll wheel on a mouse, pressing a key on a keyboard, or performing a gesture on a touch screen. In some instances, the step of positioning a pointing device is not required and merely a command to zoom in or out the map is sufficient.

According to one embodiment of the present invention, the step of positioning a pointing device may be provided by gaze information from a gaze detection device. By determining the location on a display at which a user is gazing (gaze direction), the map may zoom in or out upon that location.

Figure 3:
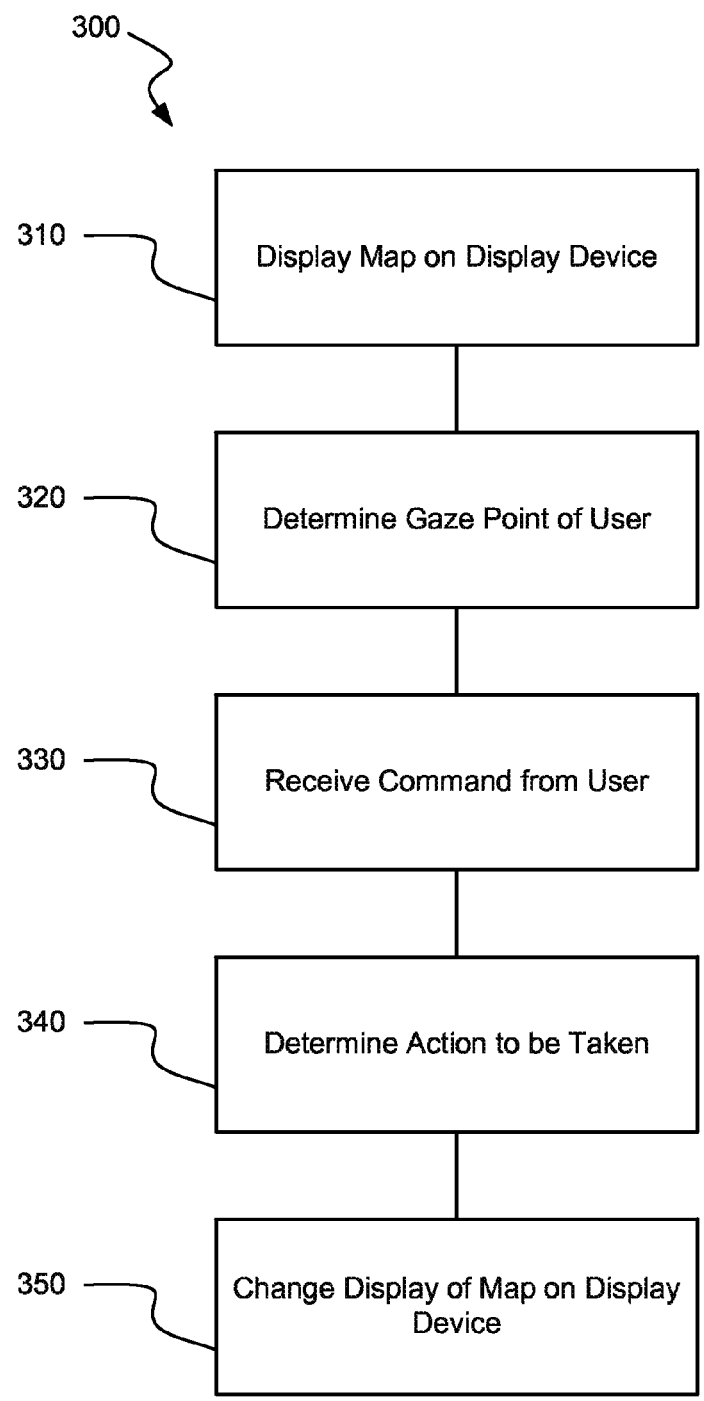
FIG. 3 is a block diagram of one method of the invention for displaying a map that is interactive based upon a gaze location of a user.

Turning to FIG. 3, an example method 300 of this embodiment of the present invention is shown. At block 310, a map is displayed on a display device. At block 320, the gaze location of a user on the map and/or display device is determined.

At block 330, a command from the user is received. The command may be provided by way of any known input means including, but not limited to, a keyboard, mouse, scroll wheel, gesture on a touch screen, gesture in 3D space, virtual reality headset, voice or the like.

At block 340, the action to be taken, depending on at least one of the gaze location and/or the command may be determined. For example, if the gaze location is anywhere except an edge region of the map, then the map may be zoomed in or out from the gaze location, possibly depending on the command received (e.g., zooming out when a voice command to that effect is received, or when a subtraction sign keystroke is received via a keyboard; and zooming in when a voice command to the effect is received, or when an addition sign keystroke is received via a keyboard).

If the gaze location is in an edge region of the map, or outside the edge of the map, then the map may be panned in the direction of the gaze location relative to the center of the map. For example, if the gaze location is to the left of the map, and a command to pan is received (e.g., via a voice command to that affect, or a keystroke such as 'p'), then a pan left action should be interpreted. Whether the map is to be zoomed or panned, at block 350 the map is redisplayed in the new configuration.

Further, when a map is zoomed according to the present invention it is advantageous to automatically pan the map a small amount to re-orient the zoomed view of the map so as to prevent distortion of the intended zoom area. In other words, if a user intends on zooming in to a point three quarters of the way across and three quarters of the way up a map, upon zooming in slightly the point will no longer be three quarters of the way up and three quarters of the way across the map. Thus as the map zooms, it must pan slightly to re-orient the point such that it remains in substantially its original position relative to the rest of the map.

Gaze Click/Command Rose

In another embodiment of the present invention, a method for manipulating navigation amongst selection choices in an on-screen display is provided.

According to this embodiment, a menu comprising multiple choices is displayed upon a display by a computer program. A user may navigate amongst the items utilizing their gaze direction, optionally in combination with another input device.

The menu may be arranged in any format, such as a traditional multiple choice menu of items, all displayed at once on the screen. Or further, a smaller amount of items may be displayed and upon one item being at least partially activated, more menu items may be displayed.

In one example of the present invention, a computer program displays an icon upon the display. Upon a gaze direction being determined to be located over or in close proximity to the icon, further icons are displayed near the initial icon and the gaze direction may move to these new icons in order to select them for activation.

In a further improvement, an input device may be used to assist with item selection on the display. For example, a key on a keyboard may be pressed and held in order to allow items within the menu to be selected. While the key is pressed down, the items in the menu change appearance whenever the gaze direction is over the item, this assist the user in knowing when an item is being selected. Upon releasing the pressed key, whichever item currently has the gaze direction over it will be activated and a computer program will perform whatever action is associated with that icon.

Consider by way of example an on-screen menu in a computer game or the like. Typically computer games require fast responses and reflexes, therefore it is advantageous to provide a method for quickly selecting an item among a plurality of choices. One such method is to display an initial icon at the center of the display, by activating an input device, such as a keyboard or mouse or game controller, the computer program is notified that the menu will be accessed via gaze information. Upon the gaze direction being located over or in close proximity to an icon, more icons appear adjacent the initial icon. These new icons may then be accessed by gazing over the icons. Upon activation of an input device, whichever icon is highlighted in response to a detected gaze direction becomes the activated icon and the computer program performs a predetermined operation. In this way a "rose"-like representation of an on screen menu may be accessed via gaze information, a "rose"-like representation being a representation where icons expand outwards from an initial small subset of icons.

Figure 4:
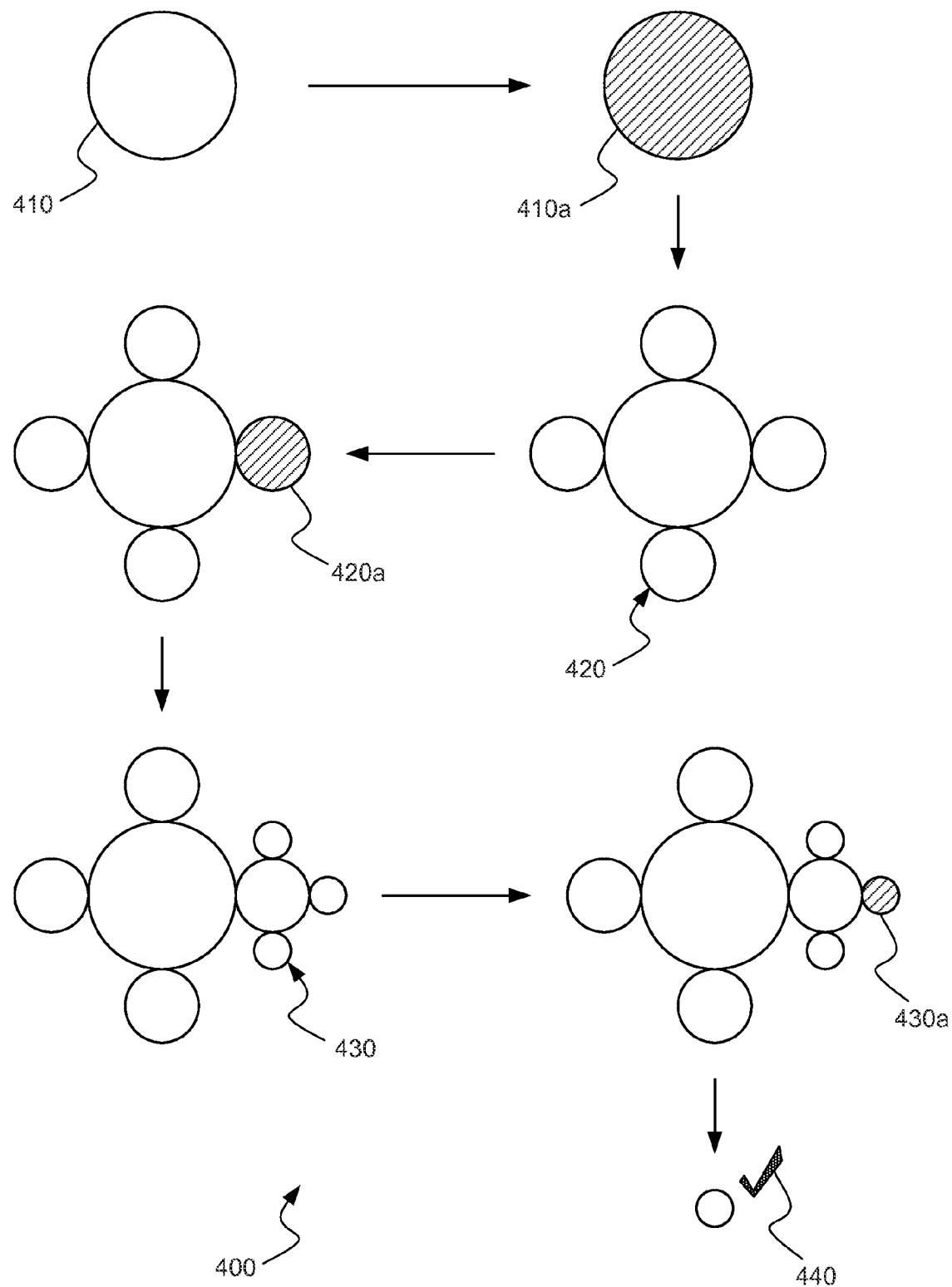
FIG. 4 is an example menu and command system of the invention which uses gaze input to make selections.

FIG. 4 demonstrates a display of such an embodiment 400. Element 410 may initially be the only element present on a display, and represent the desire to initiate a menu command. When the gaze point of a user lies on element 410, it may become shaded 410a or otherwise distinguished. Upon receipt of a further command from an input device, element 410 may be expanded to have additional sub-elements 420. Sub-elements 420 may represent sub-menus of possible commands.

When the gaze point of the user lies on a specific sub-element 420, it may become shaded 420a or otherwise distinguished. Upon receipt of a further command from an input device, element 420 may be expanded to have additional sub-sub-elements 430. Sub-sub-elements 430 may represent possible commands.

When the gaze point of the user lies on a specific sub-sub-element 430, it may become shaded 430a or otherwise distinguished. Upon receipt of a further command from an input device, gazed upon sub-sub-element 430 may be finally selected for execution.

Upon execution, the sub-sub-element may be displayed alone in isolation and/or additional graphical indicators may be displayed, such as check-mark 440. Any number of levels and sub-levels of menus and selections are possible, and FIG. 4 is only exemplary in nature. Furthermore, menu level options may disappear from display once one is selected and acted on, depending on the embodiment.

An input device may be any form of known input device such as a keyboard, mouse, voice input, gesture either contact or contact-less, virtual reality headset and the like.

Graphical Implementation of Depth of Field

In another embodiment of the present invention, gaze information is utilized to dynamically adapt a depth of field representation in an interactive entertainment program.

Gaze information provided by a gaze detection device or the like is utilized by a computer program to dynamically alter objects displayed on a display. In the case of the computer program being an interactive entertainment program such as a computer game or the like, the objects displayed on the display may be arranged to represent a view of a "real life" setting such as a street scene, landscape, building interior or the like. Often in such a computer game, a user controls a character and navigates the character through a simulated world, with the view displayed on the display representing a view of the world as seen through the character's eyes.

As a display is a two dimensional plane, graphical techniques are used to provide a simulation of a three dimensional space. One such graphical technique is varying the depth of field of various objects on the display. For example, where the game desires to indicate the user is focusing on an object "near" the character, objects that are intended to be "far" from the character may be blurred and/or their colors, sizes or other rendering characteristics may be altered, giving the user an impression that there is a depth to the scene displayed on the display.

According to the present invention, the rendering of objects on the screen is altered according to the presence or absence of gaze direction over those objects. By way of example, the invention functions in the following manner:

Items displayed on a display by a computer program;
Gaze direction information received by the computer program; and
Rendering of an item, or items, on the display is altered when the gaze direction information indicates a user is looking at said item or items.

Rendering is intended to include any form of alteration of display of a graphical object on a display, including altering of texture quality, size, color or shape, anti-aliasing and the like.

The present invention is best suited when used in combination with differed rendering, whereby sections of a displayed screen are rendered together, as opposed to a system whereby the entire scene is rendered together.

In use, this embodiment of the present invention allows a computer game to dynamically alter the depth of field shown to a user on a display, such that as the user focuses his or her gaze upon an area on the display, the displayed scene is altered to accurately represent the scene as if the user was viewing the scene in real life three dimensional space.

The altered item on the display may be an individual object, such as a building, tree, car, etc. or it may be a portion of the display such as a quarter, eighth, etc. of the displayed scene. It is entirely dependent on the rendering system of the computer program and the scene displayed, in order to determine how best to alter the depth of field so as to best represent the scene to accurately mirror real life.

Figure 5A:
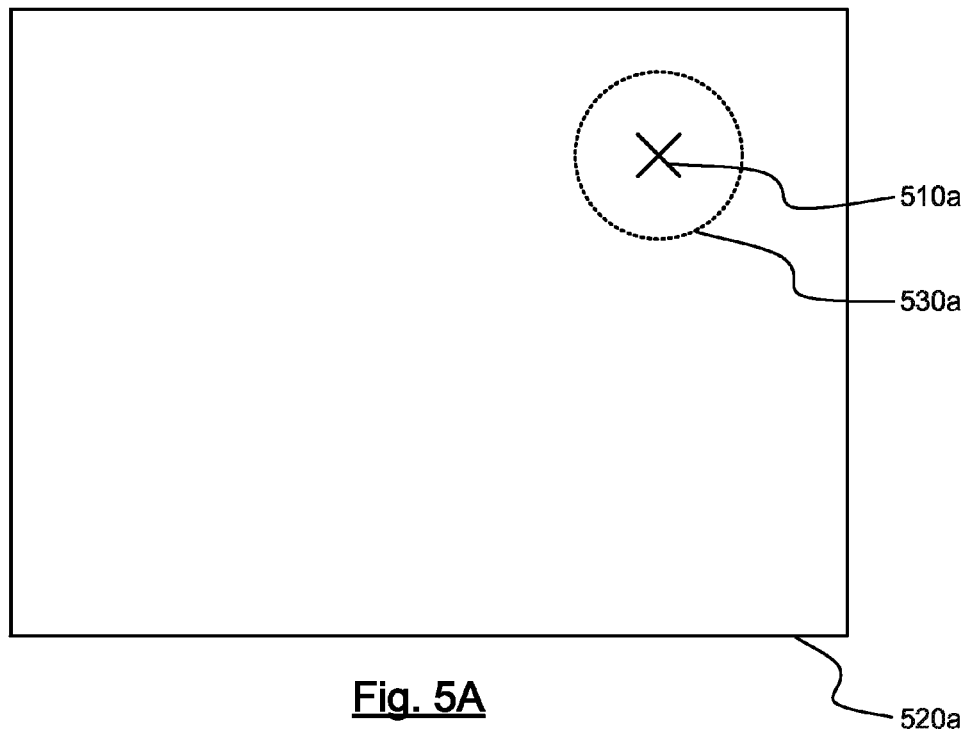
FIGS. 5A & 5B are schematic diagrams of two methods of providing depth-of-field visual effects to a viewing user.
Figure 5B:
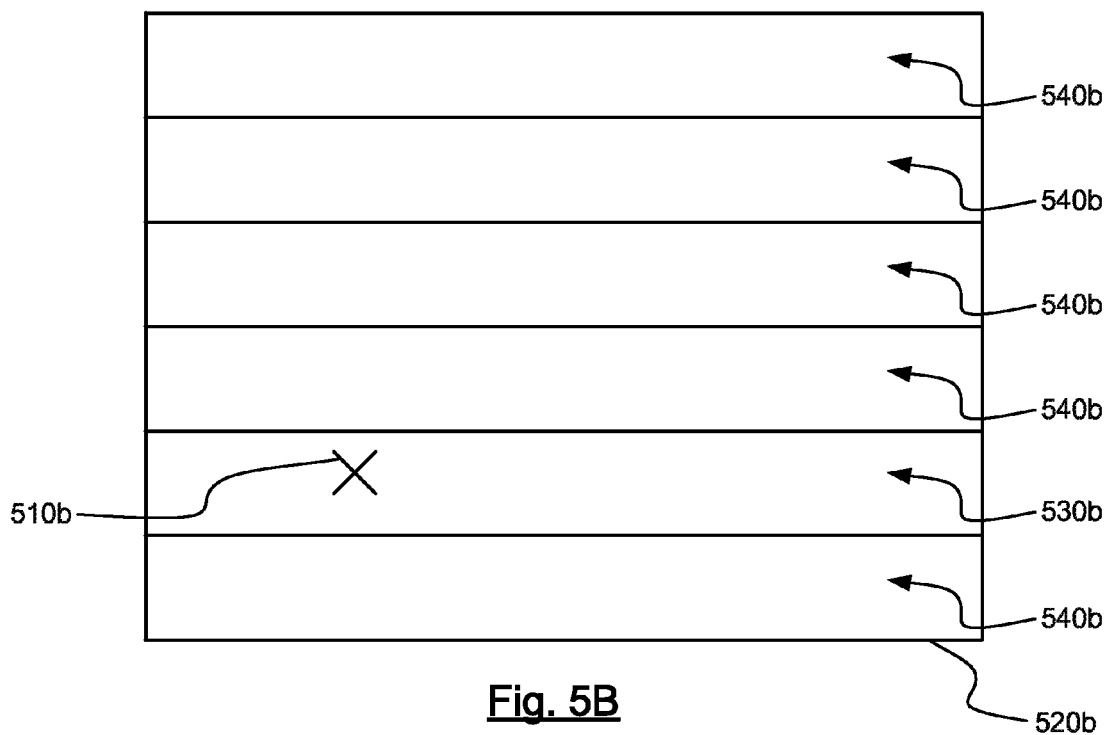

Examples of possible implementations are shown in FIGS. 5A & 5B. In FIG. 5A, gaze point 510*a* is located in the upper right corner of display 520*a*. In some embodiments, a portion 530*a* of display 520*a* may be graphically presented in a different manner than the remainder of display 520*a*. The size and shape of portion 530*a* may vary depending on the embodiment. Additionally, different areas of the display 520*a* besides the two portions shown in FIG. 5A may be displayed in different manners. For example, methods used to display portions of display 520*a* may vary as the distance from gaze point 510*a* increases. Additional methods of displaying different regions of display 520*a* based on gaze input are discussed in U.S. patent application Ser. No. 14/197,171, filed Mar. 14, 2014, and entitled "GAZE AND SACCADE BASED GRAPHICAL MANIPULATION," the entire disclosure of which is hereby incorporated by reference, for all purposes, as if fully set forth herein.

In FIG. 5B, gaze point 510*b* is located in the lower left corner of display 520*b*. In some embodiments, different horizontal layers 530, 540 of display 520*b* may be displayed in different manners in order to simulate depth of field. While layer 530*b* may be reproduced in one manner, the reproduction of layers 540*b* may change, potentially to a greater degree, the further from layer 530*b* they are.

A method of modifying the depth of field value of an object displayed on a display, as would be understood by a person skilled in the art is as follows.

Simulate a ray of light being projected from a character;
Determine which objects the ray will connect with on the display;
Depending on whether the objects are opaque or transparent, send out more than one ray;
Measure the distance between the character and a connected object;
The connected object becomes the focus of the user in order to render the object, or area of the screen containing the object, differently to other objects.

As a further improvement of the present invention, the scene may be altered such that an area of the screen upon which the user is gazing is enlarged or zoomed. In this manner a user may zoom in upon a particular portion of a scene on a display, simply by gazing at that portion.

Parallax

In a further embodiment of the present invention, eye tracking information is utilized to determine the position, angle and/or orientation of a user's head.

Figure 6A:
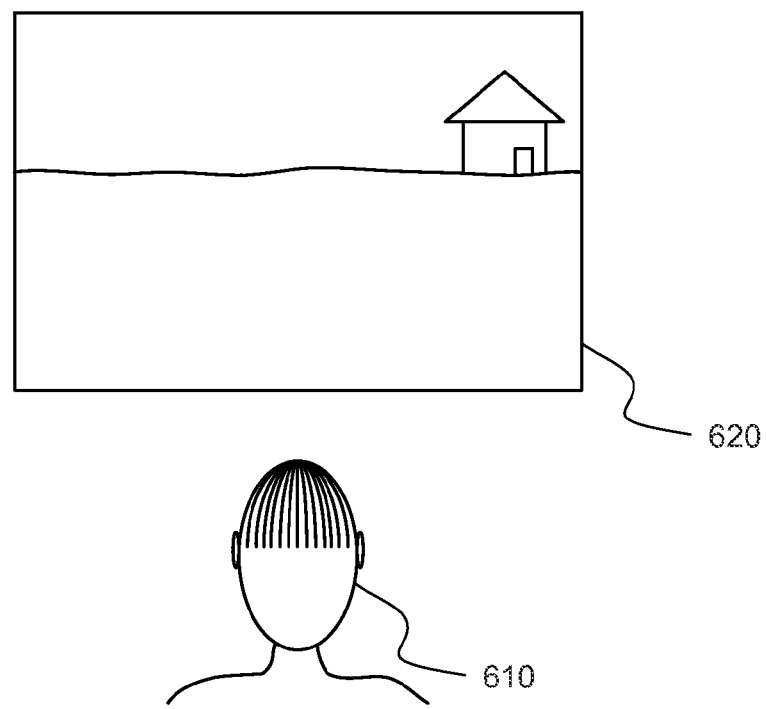
FIGS. 6A & 6B show an example result from an embodiment of the invention which modifies a display based on the user's head position.
Figure 6B:
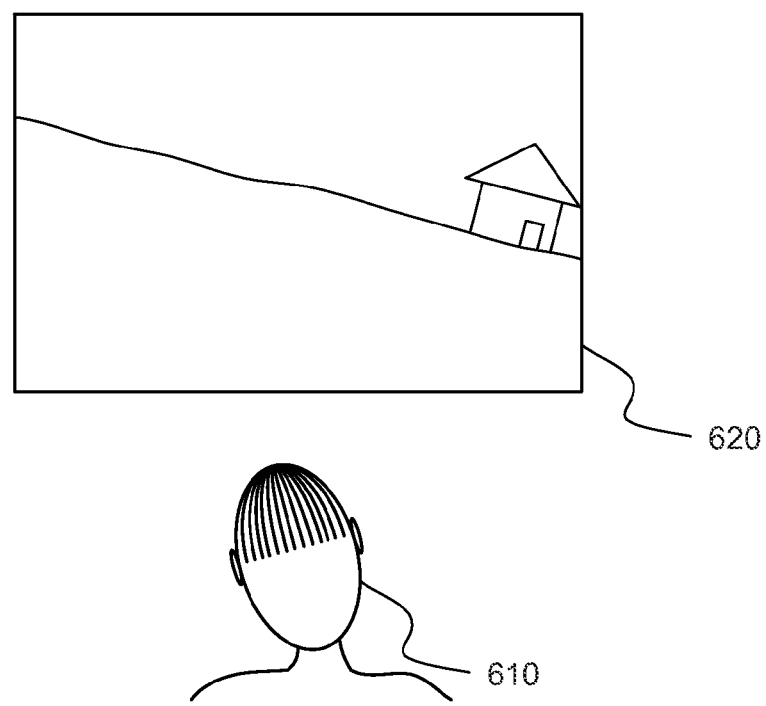

According to this embodiment, a computer program utilizes information derived from a gaze detection device to determine the position, angle, orientation and/or size of a user's head, hereafter referred to as "head information." This information may then be used to alter a graphical display as shown in the example of FIGS. 6A & 6B. In FIGS. 6A 6B, as the user 610 tilts their head to the left, the display 620 may be modified to reflect such head movement. More complicated implementations are also possible as discussed below.

Head information may be used by a computer program to alter the display and behavior of objects on a display. By way of example, when a computer program is in the form of an interactive entertainment program such as a computer game, the head information may be used to control a character displayed on the display. For example, in a form of computer game wherein a character is positioned behind a wall, the head of the character on the display may be made to mimic the movement of the head of a user in real life. In this way, for example, a user may incline his or her head slightly in a way akin to peering around a corner of the wall and the game may accept the detected head information and react to it by causing the character in the game to peer around the corner in an identical fashion.

In another example of this embodiment of the present invention, in the case where the computer program is a flight simulation computer game wherein control of an aircraft, spacecraft or similar is simulated, head information may be used to realistically portray on the display a character turning his or her head to change their field of view to encompass different portions of a cockpit or the like.

In another example of this embodiment of the present invention, in the case where the computer program is a role playing computer game or first person shooter type computer game wherein a user controls a character such that the characters field of view is displayed on the screen to present to the user a view as if the user was present in the game world in a first person setting, head information may be used to provide commands to areas of the game world or scene silently. In other words, consider a first person style computer game representing a squad based war situation, in such a situation enemy characters may be alerted by noise made by a user's character. By configuring the game to accept input commands based on head information, the user's character may be made to silently instruct and/or respond to other characters in the game, be they human controlled or computer controlled, by simply moving his or her head. For example a nod may be used to confirm an instruction.

In some embodiments, head information may be determined from or based upon gaze information provided by a gaze detection device. The gaze information may include eye location, size and orientation, pupil size, location and orientation, cornea size, location and orientation, and the like. This gaze information is then examined and an estimate of a user's head position, orientation, angle and size may be made based on information pertaining to their eyes. For example, if a user's head is tilted, then the user's eyes will be tilted at a similar angle.

Further, the gaze detection device may be adapted to provide information relating to other features on a user's face of head so as to provide a head tracking capability. This information may include location and orientation of key features such as nose, mouth, ears, hair and the like. The gaze detection device may capture images of the user's head using an image sensor located in the gaze detection device.

It is preferable that a computer program be specifically notified via an input device that head information will be provided, so that the computer program may utilize the information.

In some examples, further assistance for head position may be provided such as by infrared light reflected off a user's head and detected by an image sensor. The image sensor may be the same sensor used for gaze detection, or it may be an additional sensor. The infrared light may reflect off custom material or patterns placed on, or near a user's head for the purpose of tracking the position and orientation of the user's head.

Alternatively, a separate head tracking device may be used to determine head information and that head information may be used by a computer program alone or in combination with gaze information from a gaze detection device. Suitable head tracking devices may rely solely on images captured by a camera such as a webcam or dedicated camera, and/or may also require further hardware such as a head mountable item.

Gaze Information as Input to Interactive Events (e.g., Artificially Intelligent Characters)

In another embodiment of the present invention, gaze information may be utilized by a computer program to dynamically adjust the behavior of elements of the computer program, for example, interactive events such as artificially intelligent (AI) characters.

In the case of a computer game having computer-controlled interactive events and/or artificially intelligent characters that engage with the character controlled by the user, gaze information may be utilized to effect the behavior of the such elements in order to make their behavior seem more realistic to the user.

For the purposes of this disclosure, Artificial Intelligence (AI) and the like is intended to represent characters, events, or other items/objects within an interactive or video game. These items respond to actions by the user or other elements within the game or program so as to provide a representation or impression that they are intelligently determining the said response. In other words, the characters, events, or items/objects may or may not comprise dedicated artificial intelligence, but may also operate in an essentially binary fashion—altering their behavior between two (or more) states based on the presence or absence of gaze information.

For example, consider a computer game whereby a user is aiming a weapon at a building comprising a plurality of windows. AI characters may be made to appear at the window, e.g., in order to shoot at the user's character, in response to detecting that the user's gaze direction is over or in proximity to the window. Traditionally these characters would appear at random or due to a predefined pattern in the programming of the computer program. However, by utilizing gaze information it is possible for the computer program to determine the frequency at which a user looks at different windows on the building and ensure that the AI characters appear, or do not appear at those windows. This will increase or decrease the difficulty of the computer game depending on the preferences set for the computer game, e.g., by the developer and/or the user.

As a further example, consider a computer game whereby a user interacts with characters that are intended to act as human-like as possible. One example of a genre of games in which this is in effect are those know as Role Playing Games. In this example, gaze information may be utilized by the computer program to determine where exactly a user is looking and allow AI characters to interact with the user in a realistic manner. For example, if gaze information indicates that a user is looking at a particular area on the screen, an AI character may remark upon it or interact with that area.

As a further example, gaze information may indicate that a user's attention is or is not on the game. The game may then alter its behavior, or behavior of elements of the game based on the user's attention. For example, if it is determined by gaze information that a user does not look at a display for five minutes, the game may be at least temporarily paused and/or the characters on the display may alter their behavior or perform a specific command or function, such as speaking out.

Thus, in one embodiment, a method for changing behavior of computer program elements may be provided which essentially consists of two steps. First, using an eye tracking device, a gaze point of a user may be determined. Then, a computer system may cause an interactive event controlled by the computer system to alter its behavior based at least in part on the gaze point of the user.

In some embodiments causing the interactive event and/or AI character to alter their behavior may include causing an the event or AI character to initiate or continue interaction with the user based at least in part on the gaze point of the user being located on a particular graphical representation, perhaps of the AI character, on a display. In some embodiments, the interaction may be altered based at least in part on the gaze point of the user being located on a particular portion of such graphical representation. For example, a user looking at a weapon held by an AI character may cause the AI character to point or use the weapon in some way.

In some embodiments, the behavior of the interactive event and/or AI character may be altered based at least in part on the gaze point of the user being located on a portion of a display besides the aforementioned graphical. For example, the user gazing at a thing, creature, or other character on the display may cause an AI character or other program element to interact with that thing, creature, or other character, as well as the user.

In some embodiments, altering the behavior of an interactive event and/or AI character may include causing a program element and/or the AI character to move to or from a portion of a display proximate to the gaze point of the user. In yet other embodiments, an interactive event and/or an AI character's behavior may be altered based at least in part on the user's gaze point not being located on a display, which may or may not presently have a graphical representation of a particular program element and/or the AI character.

Figure 7:
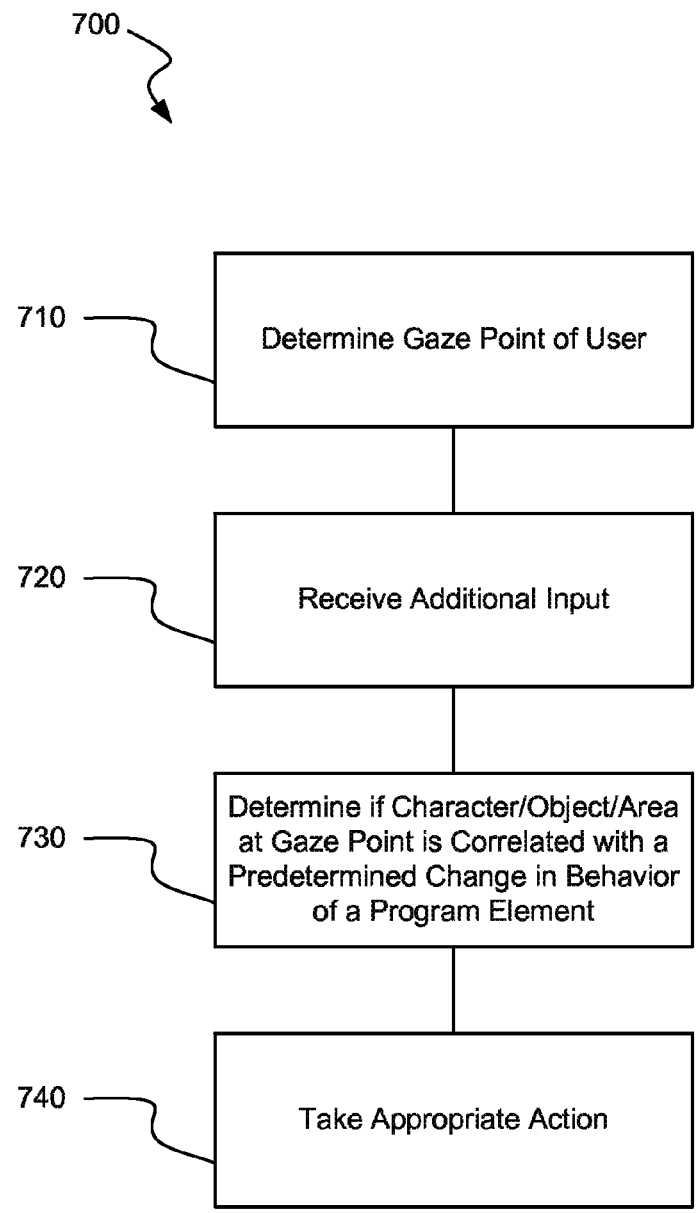
FIG. 7 is a block diagram of one method of the invention for changing the behavior of program elements based on gaze input.

Thus, in one embodiment of the invention, as shown in FIG. 7, a method 700 may be provided which determines the gaze point of a user at block 710. At block 720, additional inputs may be received from other input devices besides an eye tracking device.

At block 730, it may be determined if the gaze point of the user is located on a certain AI character, object, or other area which is correlated with a certain predetermined action to be taken by an AI character or other program element. If there is a correlation, at block 740, the appropriate predetermined action is taken. As discussed above, other factors such as secondary inputs and/or other settings may also inform which predetermined action is taken.

Gaze Triggers and the Like

In a further embodiment, triggers for interaction may be embedded within a scene displayed upon a display. These triggers may only be activated by a user's gaze being placed upon the triggers. The triggers may be visible or invisible to the user. Upon a user gazing at a trigger, a computer program may cause a specific action to happen.

For example, in a computer game displaying animals on a display, the animals may run away when a user gazes at them. In an example where the computer program is a horror type game, enemies that are intent on attacking the user's character may only move towards the user when the user is not looking at the character.

In a further embodiment, commands may be issued to characters in a multiple character game by gazing at the characters. This is particularly beneficial in games containing a large amount of characters, whereby commands must be issued to specific individual characters or groups of characters.

In a further embodiment, windows or other subdivisions of a display may be dimmed or brightened dependent on whether a user is gazing at the windows or other subdivisions. For example, if a user is gazing at a particular window, it increases in brightness compared to the rest of a display until the user gazes at another window.

With reference to any or all embodiments herein described, it is a further improvement of the present invention that information relating to a user's interaction with the computer may be stored for analysis and display to the user. For example, the computer may determine how often, the location of, and the result of each gaze or head based interaction. This may be presented to the user such that the user may analyze his or her gameplay or the gameplay of another user. This display may be in a data based format such as a table or it may be presented in a visual format such as a recording or live display of a user's gaze location as he/her interacts with the computer. For example, where the user provides gaze or head input that is utilized by the intelligence of a game, the computer may record the type of input provided and the resulting output of the game.

For the purpose of this specification, any reference to the terms "computer," "computing device" or the like is intended to mean an electronic device requiring input from a user, this includes but is not limited to: personal computers, tablets, portable computers, mobile phones, portable gaming devices, home entertainment systems, game consoles and other video game systems, televisions, microwaves, refrigerators etc.

For the purpose of this specification, any reference to the terms "eye tracking," "gaze direction," "gaze point," "point of interest," "point of interest information" or the like is intended to refer to information and/or the detection of information indicating a user's focus on a point of interest on an object, such as a display. A point of interest may be determined by any known point of interest input device such as a traditional eye tracking device utilizing at least one image sensor, at least one illumination source and a processing device to determine a point of interest from reflections of illumination in a user's eye. The point of interest however may be determined by other input devices such as gesture recognition systems, virtual reality headsets, facial detection systems, conventional keyboard and mouse, hand held controller, etc.

For the purpose of this specification, any reference to the terms "gaze detection," "gaze information," "gaze direction," "eye tracking," "point of interest," "point of regard" or the like is intended to mean information and/or the detection of information that defines the position at which a user is looking, typically upon a display or the like.

For the purpose of this specification, any reference to the terms "gaze detection device," "eye tracker" or the like is intended to mean a device by which a user's gaze direction is determined. Typically these devices comprise at least one image sensor and at least one illuminator. The at least one illuminator may emit infrared or near-infrared light that is reflected by the cornea of a user's eye and the image sensor captures an image comprising the cornea and a reflection. A computing unit determines from the position of the reflection upon the cornea the gaze direction of the user. The computing unit may be integrated with the gaze detection device on a printed circuit board or the like, or it may be integrated within the programming of a larger computing unit. Eye tracking devices suitable for the present invention are well known and would be readily understood by a person skilled in the art, for example suitable devices are provided by Tobii Technology AB of Sweden (www.tobii.com).

It is intended that any device that indicates a user's gaze direction may be used with the present invention, regardless of the technology comprised in such device including the presence of illumination. Further, gaze direction information may be provided by a unit whose primary purpose is not gaze detection, such as a camera on a mobile telephone for example.

For the purpose of this specification, any reference to the terms "computer game," "video game," "interactive entertainment program," "computer program" or the like is intended to mean a set of instructions executable by a computing device so as to provide or manipulate items displayed on a display.

For the purpose of this specification, any reference to the terms "computer," "computing device," "computing system" or the like is intended to mean any device capable of executing programmed instructions. This includes commonly known items such as desktop computers, laptop computers, netbook computers, ultrabook computers, tablet, mobile telephones, portable game consoles and other video game systems, such as those that connect to a television for entertainment purposes and the like.

The computing device(s) or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter.

Embodiments of the present invention is suitable for both remote gaze detection devices as well as wearable gaze detection devices. Virtual Reality headsets such as the Oculus Rift, wearable displays such as Google Glass and the like all have the capability of providing interactive events to a user. By providing gaze and/or head tracking capability in a wearable device, the present invention may be utilized. Further, the wearable device may provide the gaze or head information required for the present invention to function directly. As used in this application, "wearable devices" or "wearable displays and the like are intended to include any item that is adapted to be worn by a user, such as glasses, helmets or the like.

Figure 8:
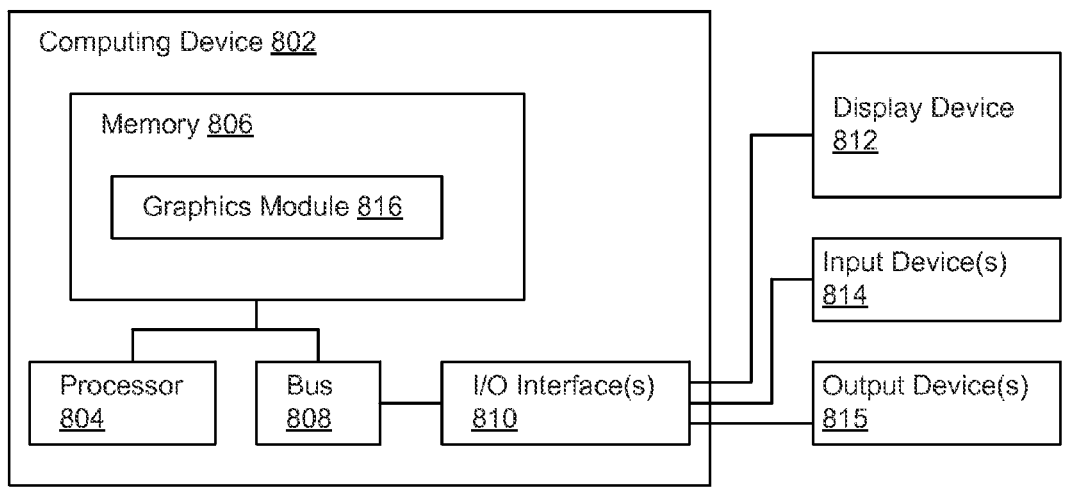
FIG. 8 is a block diagram of an exemplary computer system capable of being used in at least some portion of the apparatuses or systems of the present invention, or implementing at least some portion of the methods of the present invention.

By way of example and not limitation, FIG. 8 is a block diagram depicting an example computing device 802 for implementing certain embodiments. The computing device 802 can include a processor 804 that is communicatively coupled to a memory 806 and that executes computer-executable program instructions and/or accesses information stored in the memory 806. The processor 804 may comprise a microprocessor, an application-specific integrated circuit ("ASIC"), a state machine, or other processing device. The processor 804 can include any of a number of computer processing devices, including one. Such a processor can include or may be in communication with a computer-readable medium storing instructions that, when executed by the processor 804, cause the processor to perform the steps described herein.

The computing device 802 can also include a bus 808. The bus 808 can communicatively couple one or more components of the computing system 802. The computing device 802 can also include and/or be communicatively coupled to a number of external or internal devices, such as input or output devices. For example, the computing device 802 is shown with an input/output ("I/O") interface 810, a display device 812, input device(s) 814 and output device(s) 815.

Non-limiting examples of a display device 812 include a screen integrated with the computing device 802, a monitor external and coupled with the computing system, etc. Non-limiting examples of input devices 814 include gaze detection devices, touch screens, touch pads, external mouse devices, microphones and/or other devices mentioned herein, etc. A non-limiting example of an output device 815 is an audio speaker. In some embodiments, the display device 812, the input device(s) 814 and the output device(s) 815 can be separate devices. In other embodiments, the display device 812 and at least some of the input device(s) 814 can be integrated in the same device. For example, a display device 812 may be a screen and an input device 814 may be one or more components providing eye-tracking and/or touch-screen functions for the display device, such as emitters for emitting light and/or cameras for imaging a user's eye(s) and/or a touch area, etc. The screen, input device components and any output device components may be integrated within the same housing or in other integrated configurations.

The computing device 802 can modify, access, or otherwise use electronic content. The electronic content may be resident in any suitable non-transitory computer-readable medium and execute on any suitable processor. In one embodiment, the electronic content can reside in the memory 806 at the computing system 802. In another embodiment, the electronic content can be accessed by the computing system 802 from a remote content provider via a data network.

The memory 806 can include any suitable non-transitory computer-readable medium. A computer-readable medium may include, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

A graphics module 816 stored in the memory 806 can configure the processor 804 to prepare electronic content for rendering in a graphical interface and/or render the electronic content in the graphical interface. In some embodiments, the graphics module 816 can be a stand-alone application executed by the processor 804. In other embodiments, the graphics module 816 can be a software module included or accessible by a separate application executed by the processor 804 that is configured to modify, access, or otherwise use the electronic content.

It should be understood that the various methods described herein for interacting with and controlling computer devices and computer programs may be implemented by way of computer-readable instructions or other program code, which may have various different and alternative functional arrangements, processing flows, method steps, etc. Any suitable programming, scripting, or other type of language or combinations of languages may be used to implement the teachings contained herein in software to be used in programming or configuring a computing device.

Unless specifically stated otherwise, it is appreciated that throughout this specification discussions utilizing terms such as "processing," "computing," "calculating," "determining," and "identifying" or the like refer to actions or processes of a computing device. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The invention has now been described in detail for the purposes of clarity and understanding. However, it will be appreciated that certain changes and modifications may be practiced within the scope of the appended claims.

What is claimed is:

1. A method for providing audio to a user, wherein the method comprises:
   determining a gaze point of a user on a display;
   determining how many sound channels are produced by an audio device;
   determining a particular area of the display which is associated with each sound channel determined to be produced by the audio device;
   causing the audio device to produce audio to the user, wherein content of the audio is based at least in part on the gaze point of the user on the display;
   determining head information associated with the user;
   wherein content of the audio is further based at least in part on the head information associated with the user; and
   wherein content of the audio being based at least in part on the gaze point comprises a sound channel associated with the particular area in which the gaze point of the user is located.

2. The method for providing audio to a user of claim 1, wherein the content of the audio being based at least in part on the gaze point comprises:
   audio content associated with a particular area of the display in which the gaze point of the user is located, wherein the particular area is a sub-portion of a total area of the display.

3. The method for providing audio to a user of claim 2, wherein the content of the audio being based at least in part on the gaze point further comprises:
   no audio content associated with a remainder of the display besides the particular area.

4. The method for providing audio to a user of claim 1, wherein the content of the audio being based at least in part on the gaze point comprises:
   audio content associated with a particular area of the display in which the gaze point of the user is located, at a first volume, wherein the particular area is a sub-portion of a total area of the display; and
   audio content associated with a remainder of the display besides the particular area, at a second volume, wherein the first volume is greater than the second volume.

5. The method for providing audio to a user of claim 1, wherein determining how many sound channels are produced by the audio device comprises:
   determining how many simulated sound channels are produced by the audio device.

6. The method for providing audio to a user of claim 1, wherein the content of the audio being based at least in part on the gaze point further comprises:
   no audio content associated with at least one sound channel not associated with the particular area in which the gaze point of the user is located.

7. The method for providing audio to a user of claim 6, wherein at least one sound channel not associated with the particular area in which the gaze point of the user is located comprises:
   all sound channels not associated with the particular area in which the gaze point of the user is located.

8. The method for providing audio to a user of claim 1, wherein the method further comprises:
   the sound channel associated with the particular area in which the gaze point of the user is located, at a first volume; and
   at least one sound channel not associated with the particular area in which the gaze point of the user is located, at a second volume, wherein the first volume is greater than the second volume.

9. The method for providing audio to a user of claim 8, wherein at least one sound channel not associated with the particular area in which the gaze point of the user is located comprises:
   all sound channels not associated with the particular area in which the gaze point of the user is located.

10. The method for providing audio to a user of claim 1, wherein the method further comprises:
    determining a virtual distance and direction from each of a plurality of virtual sound sources to the gaze point of the user on the display; and
    wherein the content of the audio being based at least in part on the gaze point comprises:
       each virtual sound source being produced in a manner based at least in part on the virtual distance and direction from the virtual sound source to the gaze point of the user.

11. The method for providing audio to a user of claim 10, wherein each virtual sound source being produced in a manner based at least in part on the virtual distance and direction from the virtual sound source to the gaze point of the user comprises:
    reproducing multiple audio sources at multiple dynamic volumes.

12. The method for performing audio to a user of claim 1, wherein causing the audio device to produce audio to the user comprises:
    modifying the audio produced based upon the gaze point remaining fixated for at least a predetermined threshold of time.

13. A system for providing audio to a user, wherein the system comprises:
    an eye tracking device for at least determining a gaze point of a user on a display;
    a computer system for at least:
       causing an audio device to produce audio to the user, wherein content of the audio is based at least in part on the gaze point of the user on the display;
       determining how many sound channels are produced by the audio device;
       determining a particular area of the display which is associated with each sound channel determined to be produced by the audio device; and
       wherein the content of the audio being based at least in part on the gaze point comprises:
          at least a first frequency of sound on a first sound channel associated with the particular area in which the gaze point of the user is located; and
          at least a second frequency of sound on a second channel not associated with the particular area in which the gaze point of the user is located.

14. The system for providing audio to a user of claim 13, wherein the computer system is further for at least:
    determining how many sound channels are produced by the audio device;
    determining a particular area of the display which is associated with each sound channel determined to be produced by the audio device; and
    wherein the content of the audio being based at least in part on the gaze point comprises a sound channel associated with the particular area in which the gaze point of the user is located.

15. The system for providing audio to a user of claim 13, wherein the computer system is further for at least:
   determining a virtual distance and direction from each of a plurality of virtual sound sources to the gaze point of the user on the display; and
   wherein the content of the audio being based at least in part on the gaze point comprises:
      each virtual sound source being produced in a manner based at least in part on the virtual distance and direction from the virtual sound source to the gaze point of the user.

16. A non-transitory machine readable medium with instructions stored thereon for providing audio to a user, the instructions executable by at least one processor for at least:
   determining a gaze point of a user on a display;
   determining how many sound channels are produced by an audio device;
   determining a particular area of the display which is associated with each sound channel determined to be produced by the audio device;
   causing an audio device to produce audio to the user, wherein content of the audio is based at least in part on the gaze point of the user on the display;
   determining a virtual distance and direction from each of a plurality of virtual sound sources to the gaze point of the user on the display; and
   wherein the content of the audio being based at least in part on the gaze point comprises:
      each virtual sound source being produced in a manner based at least in part on the virtual distance and direction from the virtual sound source to the gaze point of the user; and
      a sound channel associated with the particular area in which the gaze point of the user is located.

17. A non-transitory machine readable medium with instructions stored thereon for providing audio to a user, the instructions executable by at least one processor for at least:
   determining a gaze point of a user on a display;
   causing an audio device to produce audio to the user, wherein content of the audio is based at least in part on the gaze point of the user on the display;
   determining how many sound channels are produced by the audio device;
   determining a particular area of the display which is associated with each sound channel determined to be produced by the audio device; and
   wherein the content of the audio being based at least in part on the gaze point comprises a sound channel associated with the particular area in which the gaze point of the user is located.

18. A method for providing audio to a user, wherein the method comprises:
   determining a gaze point of a user on a display;
   determining how many sound channels are produced by an audio device;
   determining a particular area of the display which is associated with each sound channel determined to be produced by the audio device;
   causing the audio device to produce audio to the user, wherein content of the audio is based at least in part on the gaze point of the user on the display;
   determining head information associated with the user;
   wherein content of the audio is further based at least in part on the head information associated with the user; and
   wherein content of the audio being based at least in part on the gaze point comprises:
      at least a first frequency of sound on a first sound channel associated with the particular area in which the gaze point of the user is located; and
      at least a second frequency of sound on a second channel not associated with the particular area in which the gaze point of the user is located.

19. A non-transitory machine readable medium with instructions stored thereon for providing audio to a user, the instructions executable by at least one processor for at least:
   determining a gaze point of a user on a display;
   determining how many sound channels are produced by an audio device;
   determining a particular area of the display which is associated with each sound channel determined to be produced by the audio device;
   causing an audio device to produce audio to the user, wherein content of the audio is based at least in part on the gaze point of the user on the display;
   determining a virtual distance and direction from each of a plurality of virtual sound sources to the gaze point of the user on the display; and
   wherein the content of the audio being based at least in part on the gaze point comprises:
      each virtual sound source being produced in a manner based at least in part on the virtual distance and direction from the virtual sound source to the gaze point of the user;
      at least a first frequency of sound on a first sound channel associated with the particular area in which the gaze point of the user is located; and
      at least a second frequency of sound on a second channel not associated with the particular area in which the gaze point of the user is located.

* * * * *